(12) United States Patent
Liu et al.

(10) Patent No.: US 9,425,972 B2
(45) Date of Patent: Aug. 23, 2016

(54) METHOD, DEVICE, AND SYSTEM FOR ESTABLISHING CASCADE OF MULTIPOINT CONTROL SERVERS

(71) Applicant: Huawei Technologies Co., Ltd., Shenzhen (CN)

(72) Inventors: Yanxiong Liu, Shenzhen (CN); Shaofang Lu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 134 days.

(21) Appl. No.: 14/567,769

(22) Filed: Dec. 11, 2014

(65) Prior Publication Data

US 2015/0092617 A1 Apr. 2, 2015

Related U.S. Application Data

(63) Continuation of application No. PCT/CN2013/073787, filed on Apr. 7, 2013.

(30) Foreign Application Priority Data

Jun. 11, 2012 (CN) .......................... 2012 1 0190746

(51) Int. Cl.
*H04L 12/18* (2006.01)
*H04N 7/15* (2006.01)
*H04L 29/06* (2006.01)

(52) U.S. Cl.
CPC ........ *H04L 12/1822* (2013.01); *H04L 65/1046* (2013.01); *H04L 65/1069* (2013.01); *H04L 65/1096* (2013.01); *H04L 65/403* (2013.01); *H04L 65/80* (2013.01); *H04N 7/152* (2013.01)

(58) Field of Classification Search
None
See application file for complete search history.

(56) References Cited

U.S. PATENT DOCUMENTS

| 7,492,730 B2 | 2/2009 | Eshel et al. |
| 2002/0064136 A1* | 5/2002 | O'Neil ................ H04L 12/1827 370/267 |

(Continued)

FOREIGN PATENT DOCUMENTS

| CN | 1735190 A | 2/2006 |
| CN | 101345844 A | 1/2009 |

(Continued)

OTHER PUBLICATIONS

Cho, Y., et al., "Policy-Based Distributed Management Architecture for Large-Scale Enterprise Conferencing Service Using SIP," IEEE Journal on Selected Areas in Communications, vol. 23, No. 10, Oct. 2005, 16 pages.

*Primary Examiner* — Andrew Lai
*Assistant Examiner* — Jamaal Henson
(74) *Attorney, Agent, or Firm* — Slater Matsil, LLP

(57) ABSTRACT

The method according to embodiments of the present invention includes: allocating, by a management platform, a first multipoint control server to a first conference according to conference information of the first conference carried in a call from any site, where the conference information of the first conference includes a conference access number of the first conference and a site number included in the first conference, and the site number included in the first conference includes a conference access number of a second conference; and allocating, by the management platform, a second multipoint control server to the second conference according to conference information of the second conference carried in a call from the first multipoint control server, and establishing a cascading channel between the first multipoint control server and the second multipoint control server.

19 Claims, 8 Drawing Sheets

(56) References Cited

U.S. PATENT DOCUMENTS

| | | | |
|---|---|---|---|
| 2007/0285501 A1* | 12/2007 | Yim | H04L 12/66 348/14.08 |
| 2010/0241721 A1 | 9/2010 | Cha | |
| 2010/0268541 A1 | 10/2010 | Li | |
| 2012/0072499 A1* | 3/2012 | Cipolli | H04N 7/15 709/204 |
| 2013/0250037 A1* | 9/2013 | Cipolli | H04N 7/152 348/14.09 |

FOREIGN PATENT DOCUMENTS

| | | |
|---|---|---|
| CN | 101388997 A | 3/2009 |
| CN | 101582917 A | 11/2009 |
| CN | 101588253 A | 11/2009 |
| CN | 101867771 A | 10/2010 |
| CN | 102710922 A | 10/2012 |

\* cited by examiner

METHOD, DEVICE, AND SYSTEM FOR ESTABLISHING CASCADE OF MULTIPOINT CONTROL SERVERS

This application is a continuation of International Application No. PCT/CN2013/073787, filed on Apr. 7, 2013, which claims priority to Chinese Patent Application No. 201210190746.4, filed on Jun. 11, 2012, both of which are hereby incorporated by reference in their entireties.

TECHNICAL FIELD

The present invention relates to the communications field, and in particular, to a method, a device, and a system used for establishing a cascade of multipoint control servers.

BACKGROUND

Video conferencing is a communication manner that allows users at two or more places to hold a conference by using televisions and telephones, where voice and pictures are transferred in real time. By using this service, customers, colleagues, and partners at any place may be connected to hold a conference together. This is especially useful for an enterprise having a plurality of branches to hold a global conference or a conference across different regions. A typical multipoint conference system includes a management platform, multipoint control units (MCU for short), and a terminal. The management platform provides core functions of the multipoint conference system, such as resource management, conference management and scheduling, and user management. The multipoint control units and the terminals are in a point-to-point connection and cooperate to establish a multipoint conference; and the terminal may be a video terminal, an audio terminal, or an audio and video combined terminal.

Video conferencing terminals may be distributed around the globe, and it is impossible to use one multipoint control unit to meet requirements; therefore, in order to ensure conference quality, multipoint conferences need to be cascaded on a plurality of multipoint control units, so that a terminal accesses a multipoint control device nearby.

In the prior art, referring to FIG. 1, a large-scale conference is defined by using a management platform, where the large-scale conference includes several small-scale conferences. Conference data is associated with a plurality of MCUs. A terminal calls a conference access number of a small-scale conference. The management platform holds these small-scale conferences and then cascades different MCUs allocated to the small-scale conferences, thereby implementing cascading of the small-scale conferences. However, the small-scale conferences need to be separately held before being cascaded, and an administrator must know a conference access number of each small-scale conference, where operations are very complex.

SUMMARY

Embodiments of the present invention provide a method, a device, and a system for establishing a cascade of multipoint control servers, where a conference access number of a second conference is added as a site of a first conference to the first conference, so that the first conference automatically activates the second conference and automatically establishes a cascading channel between the first conference and the second conference, thereby implementing automatic holding and cascading of conferences. In order to achieve the objective, the embodiments of the present invention use the following technical solutions.

According to one aspect, an embodiment of the present invention provides a method for establishing a cascade of multipoint control servers. A management platform allocates a first multipoint control server to a first conference according to conference information of the first conference carried in a call from any site. The conference information of the first conference includes a conference access number of the first conference and a site number included in the first conference, and the site number included in the first conference includes a conference access number of a second conference. The management platform receives a request for calling the second conference from the first multipoint control server. The request for calling the second conference carries conference information of the second conference; and allocating, by the management platform, a second multipoint control server to the second conference according to the conference information of the second conference. The conference information of the second conference includes the conference access number of the second conference and a site number included in the second conference. The management platform establishes a cascading channel between the first multipoint control server and the second multipoint control server.

According to another aspect, an embodiment of the present invention provides a management platform. A first scheduling unit is configured to allocate a first multipoint control server to a first conference according to conference information of the first conference carried in a call from any site. The conference information of the first conference includes a conference access number of the first conference and a site number included in the first conference, and the site number included in the first conference includes a conference access number of a second conference. A second scheduling unit is configured to allocate a second multipoint control server to the second conference according to conference information of the second conference carried in a call from the first multipoint control server. The conference information of the second conference includes the conference access number of the second conference and a site number included in the second conference. In establishing unit is configured to establish a cascading channel between the first multipoint control server and the second multipoint control server.

According to still another aspect, an embodiment of the present invention provides a system for establishing a cascade of multipoint control servers. The system includes the foregoing management platform. Multipoint control servers are configured to call sites to hold a conference. A terminal is configured to join the conference by using one of the multipoint control servers.

According to the method, the device, and the system for establishing a cascade of multipoint control servers according to the embodiments of the present invention, a conference access number of a second conference is added as a site of a first conference to the first conference, so that the first conference automatically activates the second conference and automatically establishes a cascading channel between the first conference and the second conference, thereby implementing automatic holding and cascading of conferences. This resolves a problem of complex operations caused by separately holding conferences before cascading the conferences.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
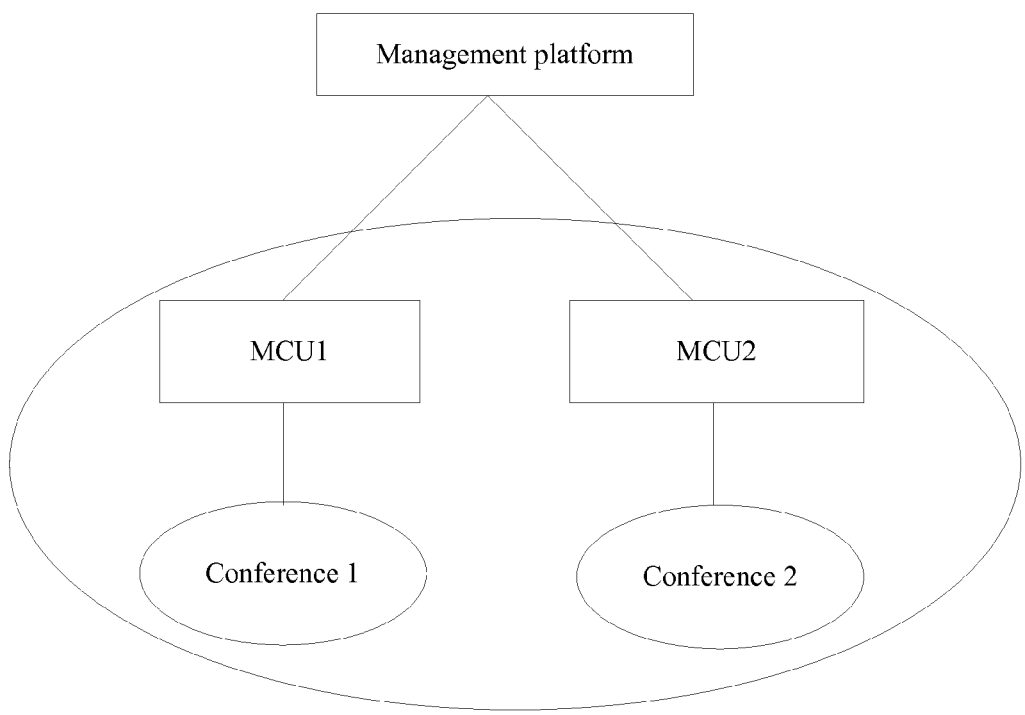
FIG. 1 is a diagram of a conference cascading system in the prior art.
Figure 2:
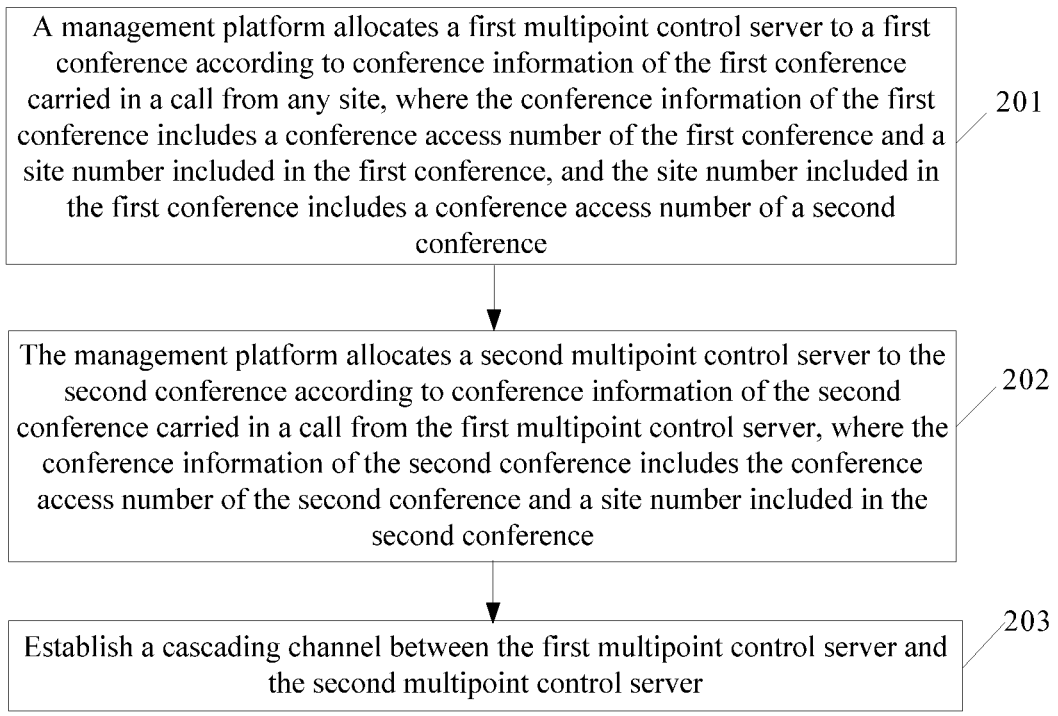
FIG. 2 is a flowchart of a method for establishing a cascade of multipoint control servers according to an embodiment of the present invention.

In one aspect, an embodiment of the present invention provides a method for establishing a cascade of multipoint control servers. Referring to FIG. 2, the method includes the following steps.

201. A management platform allocates a first multipoint control server to a first conference according to conference information of the first conference carried in a call from any site, where the conference information of the first conference includes a conference access number of the first conference and a site number included in the first conference, and the site number included in the first conference includes a conference access number of a second conference.

Exemplarily, that a management platform allocates a first multipoint control server to a first conference according to conference information of the first conference carried in a call from any site may include receiving, by the management platform, a request for calling the conference access number of the first conference from the any site; allocating, by the management platform, the first multipoint control server to the first conference according to a conference scheduling policy; and instructing, by the management platform, the first multipoint control server to hold a conference, so that the first multipoint control server calls a site included in the first conference to join the conference.

Further, the method may further include: querying, by the management platform, conference status information of the first conference according to the conference access number of the first conference, determining that the first conference is in an ongoing state, and adding the any site to the first conference, which may specifically include: after determining, by the management platform according to the conference information of the first conference, that a number of the any site is one of site numbers included in the first conference, sending an address of the first multipoint control server to the any site, so that the any site calls the first multipoint control server to join the first conference; or after determining, by the management platform according to the conference information of the first conference, that a number of the any site is not one of site numbers included in the first conference, allocating the any site to the first multipoint control server, and sending an address of the first multipoint control server to the any site, so that the any site calls the first multipoint control server to join the first conference.

202. The management platform allocates a second multipoint control server to the second conference according to conference information of the second conference carried in a call from the first multipoint control server, where the conference information of the second conference includes the conference access number of the second conference and a site number included in the second conference.

Before the management platform allocates the second multipoint control server to the second conference, the method further includes: receiving, by the management platform, a request for calling the second conference from the first multipoint control server, where the request for calling the second conference carries the conference information of the second conference.

Exemplarily, that the management platform allocates a second multipoint control server to the second conference according to conference information of the second conference carried in a call from the first multipoint control server may include: receiving, by the management platform, the request for calling the conference access number of the second conference from the first multipoint control server; adding, by the management platform, the conference access number of the first conference to the conference information of the second conference; allocating, by the management platform, the second multipoint control server to the second conference according to the conference scheduling policy; and instructing, by the management platform, the second multipoint control server to hold a conference, so that the second multipoint control server calls sites included in the second conference to join the conference.

203. The management platform establishes a cascading channel between the first multipoint control server and the second multipoint control server.

Exemplarily, the method may include: receiving, by the management platform, the request for calling the conference access number of the first conference from the second multipoint control server; and sending, by the management platform, an address of the first multipoint control server to the second multipoint control server, so that the second multipoint control server calls the first multipoint control server to establish the cascading channel between the first multipoint control server and the second multipoint control server.

According to the method for establishing a cascade of multipoint control servers according to this embodiment of the present invention, a conference access number of a second conference is added as a site of a first conference to the first conference, so that the first conference automatically activates the second conference and automatically establishes a cascading channel between the first conference and the second conference, thereby implementing automatic holding and cascading of conferences. This resolves a problem of complex operations caused by separately holding conferences before cascading the conferences.

A method for establishing a cascade of multipoint control servers to is described in detail in another embodiment of the present invention.

Exemplarily, a system to which the method according to this embodiment of the present invention is applied may include a management platform, at least two multipoint control servers, and at least one terminal, where the multipoint control servers may be MCUs, and MCUs are used as multipoint control servers in this embodiment. The management platform and the MCUs are connected by using a network, which may be a local area network, a wide area network, a private-line network, or the like. The management platform is configured to schedule conferences and allocate MCU resources to the conferences; the MCUs are configured to provide access for the terminal and exchange, forward, and process audio and video streams; and the terminal is connected to one of the MCUs by using a network, and the terminal may be a video terminal, an audio terminal, or an audio and video combined terminal.

Exemplarily, a site refers to a participant of a conference, and may be a terminal. One conference may participate, as a site of another conference, in the another conference; so as to implement cascading of the two conferences.

Exemplarily, conference information is predefined and stored in the management platform. The predefined conference information includes a conference access number of each conference and a site number included in each conference, where the site number of one conference may include a conference access number of another conference. Therefore, a tree-like structure is formed between the conferences. For example, in this embodiment, four conferences, that is, a first conference to a fourth conference, are predefined; conference information of the predefined conferences is stored in the management platform, where conference information of each conference includes its unique conference access number and numbers of a plurality of sites. A site may include a terminal and conference access numbers of other conferences. For example, conference access numbers of the second conference and the third conference are site numbers of the first conference, and a conference access number of the fourth conference is a site number of the second conference. Therefore, a tree-like topology relationship is formed among the conferences. Conferences and a topology relationship among the conferences included in the conference information may be customized according to requirements and actual conditions.

This embodiment is described by using an example in which a first conference and a second conference are held and a cascading channel between a first MCU and a second MCU is established.

Figure 3:
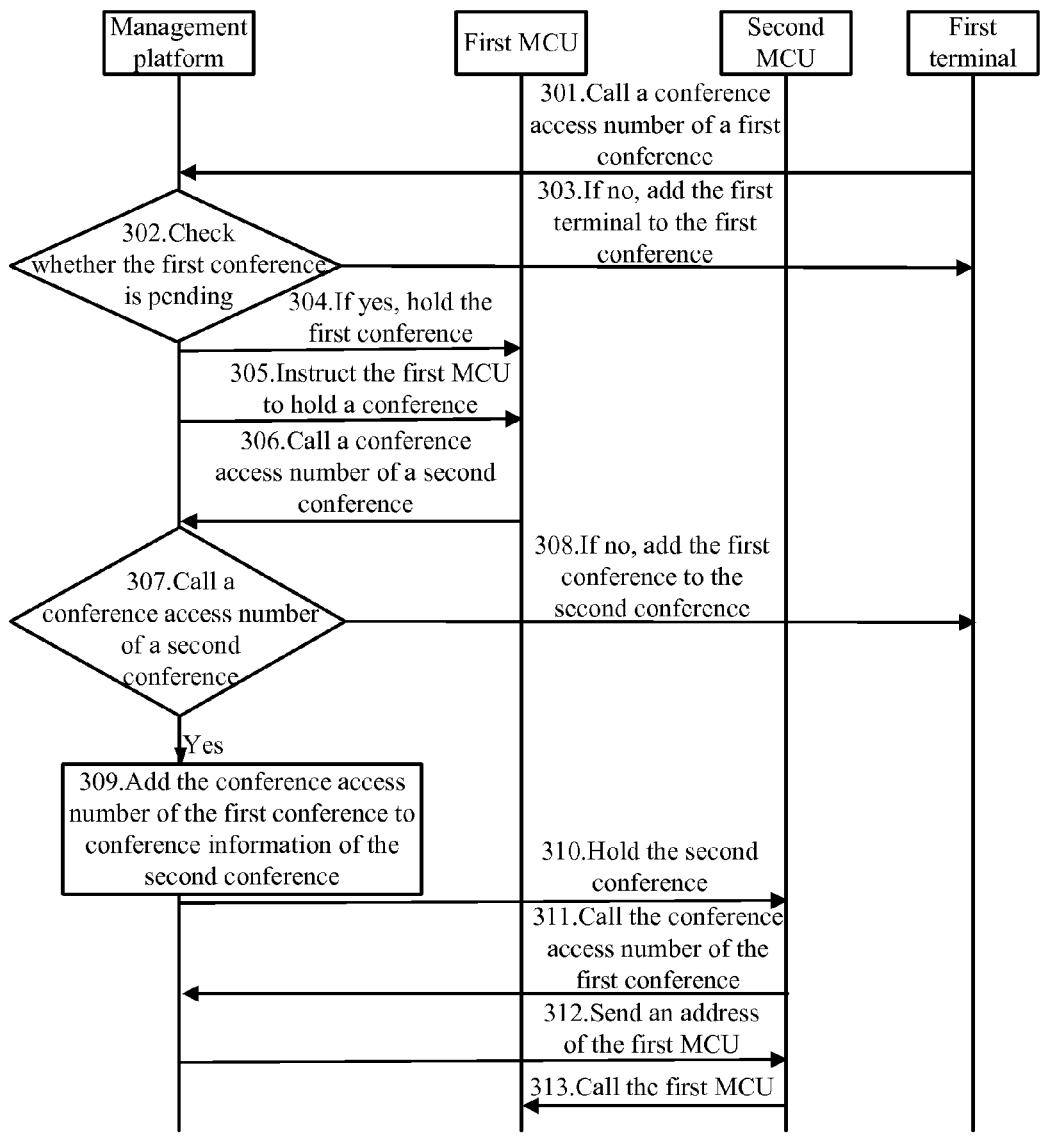
FIG. 3 is a flowchart of another method for establishing a cascade of multipoint control servers according to an embodiment of the present invention.

Referring to FIG. 3, the method may include the following steps.

301. A management platform receives a request for calling a conference access number of the first conference from a first terminal.

Exemplarily, the management platform may receive a request for calling a conference access number from any site. Step 301 is described by using an example in which the site is a terminal, but is not limited to the terminal. For example, the management platform receives the request for calling the conference access number of the first conference to join the first conference from the first terminal.

302. The management platform queries whether the first conference is in an ongoing state.

Exemplarily, the management platform may query, according to the conference access number of the first conference and recorded conference status information, whether the first conference is in an ongoing state, where a conference being in an ongoing state indicates that a site accesses the conference and an MCU resource is allocated to at least one site. The management platform may record status information of a conference. For example, if a site accesses a certain conference and an MCU resource is allocated to at least one site, the management platform records a conference state of the conference as an ongoing state; and if no site is called into the conference and no site occupies an MCU resource, the management platform records a state of the conference as a pending state.

303. The management platform adds the first terminal to the first conference if the first conference is in the ongoing state.

Exemplarily, during a process of adding the first terminal to the first conference, the management platform may first determine, according to the conference information of the first conference, whether a number of the first terminal is one of site numbers included in the first conference.

If it is determined, according to the conference information of the first conference, that the number of the first conference is one of the site numbers included in the first conference, the management platform sends an address of an MCU (the first MCU) allocated to the first conference to the first terminal, so that the first terminal calls the first MCU to join the first conference and data of the first conference can be shared.

If it is determined, according to the conference information of the first conference, that the number of the first conference is not on the first MCU included in the first conference, the management platform sends an address of the first MCU to the first terminal, so that the first terminal calls the first MCU to join the first conference and data of the first conference can be shared.

304. The management platform allocates the first MCU to the first conference according to a conference scheduling policy if the first conference is in a pending state.

Exemplarily, the conference scheduling policy may be stored in the management platform, and may also be stored in another storage unit for the management platform to use. The conference scheduling policy may be as follows: scheduling port resources of an MCU according to a quantity of sites included in a conference. For example, if port resources of the first MCU are more than resources required by sites included in the first conference, the sites included in the first conference are allocated to the first MCU, so that the first conference is held on the first MCU.

305. The management platform instructs the first MCU to hold a conference.

Exemplarily, after allocating the first MCU to the first conference, the management platform instructs the first MCU to hold a conference; and the first MCU calls a number of a site that is allocated to the first MCU. For example, a conference access number of the second conference is one of site numbers included in the first conference, and therefore, the conference access number of the second conference is allocated to the first MCU, and the first MCU calls the conference access number of the second conference.

306. The management platform receives a request for calling the conference access number of the second conference from the first MCU.

307. The management platform queries whether the second conference is in an ongoing state.

Exemplarily, the management platform may query, according to the conference access number of the second conference and recorded conference status information, whether the second conference is in an ongoing state, where a principle and a method are the same as those for querying whether the first conference is in an ongoing state, and therefore no further details are provided herein.

308. The management platform adds the first conference to the second conference if the second conference is in the ongoing state.

Exemplarily, during a process of adding the first conference to the second conference, the management platform may first determine, according to the conference information of the second conference, whether the conference access number of the first conference is one of site numbers included in the second conference.

If it is determined, according to the conference information of the second conference, that the conference access number of the first conference is one of the site numbers included in the second conference, the management platform sends an address of an MCU (the second MCU) allocated to the second conference to the first MCU, so that the first MCU calls the second MCU, a cascading channel between the first MCU and the second MCU is established, and the first MCU and the second MCU can share data. This case is applicable to cascading of two conferences that have been held separately.

If it is determined, according to the conference information of the second conference, that the number of the first conference is not one of the site numbers included in the second conference, the management platform allocates port resources of the MCU (the second MCU) allocated to the second conference to the conference access number of the first conference, and sends the address of the second MCU to the first MCU, so that the first MCU calls the second MCU, a cascading channel between the first MCU and the second MCU is established, and the first MCU and the second MCU can share data. This case is also applicable to cascading of two conferences that have been held separately.

309. If the second conference is in a pending state, the management platform adds the conference access number of the first conference to the conference information of the second conference.

Exemplarily, that the management platform adds the conference access number of the first conference to the conference information of the second conference may be as follows: adding, by the management platform, the conference access number of the first conference as a site number included in the second conference, so that the conference access number of the first conference is used as one of the site numbers included in the second conference.

310. The management platform allocates the second MCU to the second conference according to the conference scheduling policy.

Exemplarily, if port resources of the second MCU are more than resources required by sites included in the second conference, the management platform allocates the sites included in the second conference to the second MCU, so that the second conference is held on the second MCU.

311. The management platform instructs the second MCU to hold a conference.

Exemplarily, after allocating the second MCU to the second conference, the management platform instructs the second MCU to hold a conference; and the second MCU calls a number of a site that is allocated to the second MCU. For example, the conference access number of the first conference is one of the site numbers included in the second conference, and therefore, the conference access number of the first conference is allocated to the second MCU, and the second MCU calls the conference access number of the first conference.

312. The management platform receives a request for calling the conference access number of the first conference from the second MCU.

Exemplarily, by now, both the first conference and the second conference are in an ongoing state. Therefore, after receiving the request for calling the conference access number of the first conference from the second MCU, the management platform adds the second conference to the first conference, which is, in essence, establishing a cascading channel between the first MCU and the second MCU. A principle and a process of establishing the cascading channel is the same as those in step 308; and a difference from step 308 lies in that the second conference is held by using the call of the first MCU allocated to the first conference.

313. The management platform sends an address of the first MCU to the second MCU.

314. The second MCU calls the first MCU to establish a cascading channel between the first MCU and the second MCU.

Preferably, a plurality of management platforms may be selected as long as conference information of a multipoint conference is preset on each management platform. Assuming that a first management platform is set on a side of the first conference and a second management platform is set on a side of the second conference, where a principle of holding the first conference and the second conference and a principle of cascading the first conference and the second conference are the same as those in the foregoing method, and therefore no further details are provided herein and only differences during a specific process are described. That is, after the conference access number of the second conference is scheduled to the first MCU of the first conference, the first MCU initiates a call to the second management platform to call the conference access number of the second conference; the second management platform schedules the second conference; and the conference access number of the first conference is scheduled to the second MCU on the second conference side. Likewise, the second MCU initiates a call to the first management platform to call the conference access number of the first conference; the first management platform sends the address of the first MCU to the second MCU; and the second MCU calls the first MCU, so as to cascade the first MCU and the second MCU.

An effect of selecting a plurality of management platforms is to facilitate information exchange between the management platforms.

In an actual application, if a conference to be held changes, the management platform obtains modified conference information.

This embodiment may be specifically applied to conferences held by governments within a country or conferences held between a plurality of enterprises; an example in which conferences are held by government within a country is briefly described.

On a management platform, conferences of various levels of organizational structures including a province, a city, and a county are defined and conference information and conference access numbers are published.

The conference information and a conference topology relationship are added to the management platform. For example, a conference access number of county 1 is added, as a site number of a conference of city 1, to conference information of city 1; a conference access number of county 2 is added, as a site number of a conference of city 2, to conference information of city 2; and conference access numbers of county 1 and county 2 are added, as site numbers of a conference of a province, into conference information of the province.

A terminal calls a conference access number of the province, and various levels of conferences under the provincial conference are activated one by one and are automatically cascaded.

According to the method for establishing a cascade of multipoint control servers according to this embodiment of the present invention, a conference access number of a second conference is added as a site of a first conference to the first conference, so that the first conference automatically activates the second conference and automatically establishes a cascading channel between the first conference and the second conference, thereby implementing automatic holding and cascading of conferences. This resolves a problem of complex operations caused by separately holding conferences before cascading the conferences.

In one aspect, an embodiment of the present invention provides a management platform 40, where the management platform 40 is applied to the method shown in FIG. 2.

Exemplarily, a system to which the management platform 40 according to this embodiment of the present invention is applied may include the management platform 40, at least two multipoint control servers, and at least one terminal, where the multipoint control servers may be MCUs, and MCUs are used as multipoint control servers in this embodiment. The management platform 40 and the MCUs are connected by using a network, which may be a local area network, a wide area network, a private-line network, or the like. The management platform 40 is configured to schedule conferences and allocate MCU resources to the conferences; the MCUs are configured to provide access for the terminal and exchange, forward, and process audio and video streams; and the terminal is connected to one of the MCUs by using a network, and the terminal may be a video terminal, an audio terminal, or an audio and video combined terminal.

Exemplarily, conference information is predefined. The predefined conference information includes a conference access number of each conference and a site number included in each conference, where the site number of one conference may include a conference access number of another conference. Therefore, a tree-like structure is formed among the conferences. For example, in this embodiment, four conferences, that is, a first conference to a fourth conference, are predefined, where conference access numbers of the second conference and the third conference are site numbers of the first conference, and a conference access number of the fourth conference is a site number of the second conference. Therefore, a tree-like topology relationship is formed among the conferences. Conferences and a topology relationship among the conferences included in the conference information may be customized according to requirements and actual conditions.

This embodiment is described by using an example in which a first conference and a second conference are held and a cascading channel between a first MCU and a second MCU is established.

Figure 4:
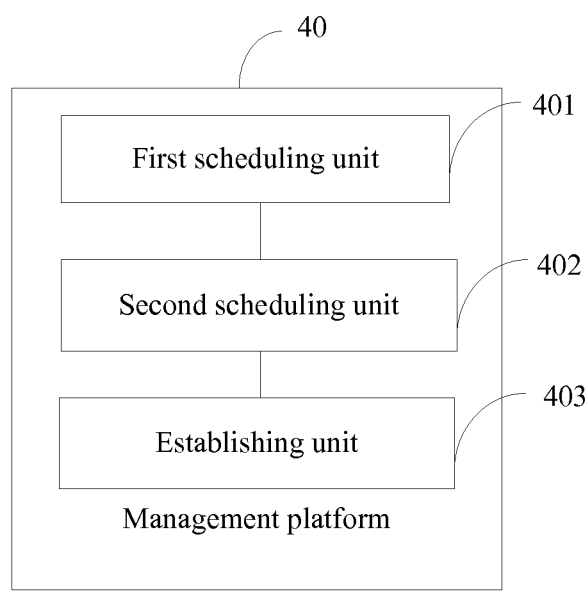
FIG. 4 is a structural diagram of a management platform according to an embodiment of the present invention.
Figure 5:
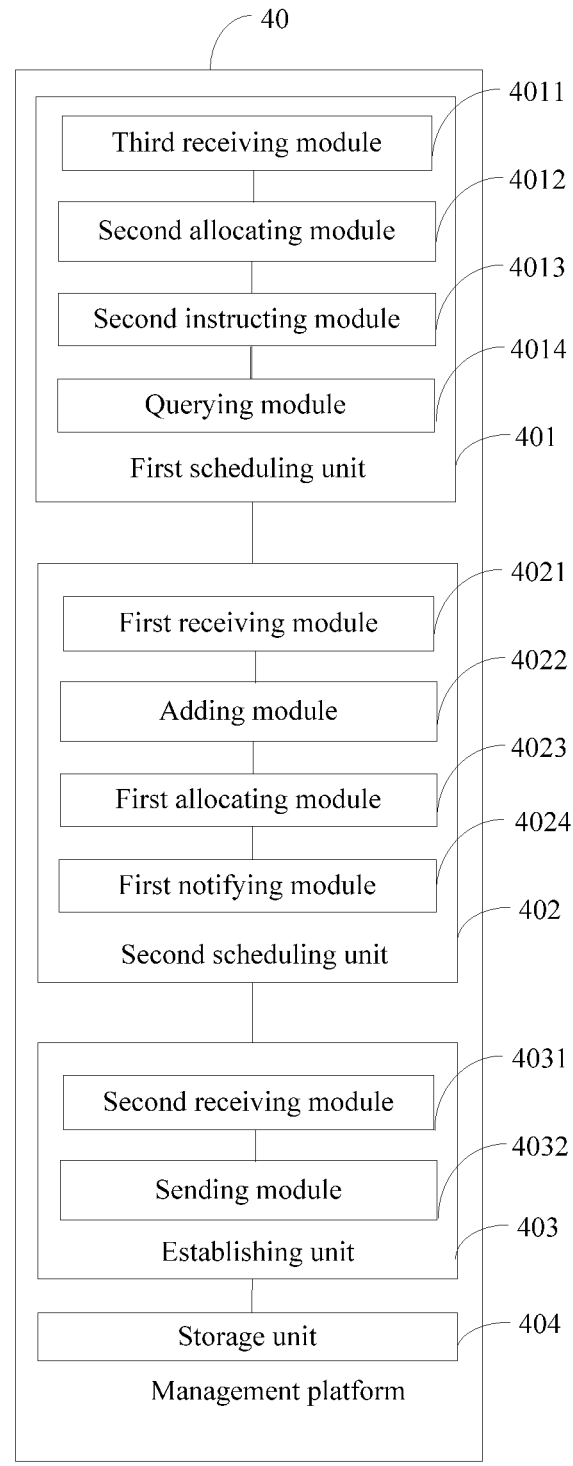
FIG. 5 is a structural diagram of another management platform according to an embodiment of the present invention.

Referring to FIG. 4 to FIG. 5, the management platform 40 includes: a first scheduling unit 401, a second scheduling unit 402, an establishing unit 403, and a storage unit 404.

The first scheduling unit 401 is configured to allocate a first multipoint control server to the first conference according to conference information of the first conference carried in a call from any site, where the conference information of the first conference includes a conference access number of the first conference and a site number included in the first conference, and the site number included in the first conference includes a conference access number of the second conference.

Exemplarily, the first scheduling unit 401 may include the following modules.

A third receiving module 4011 is configured to receive a request for calling the conference access number of the first conference from the any site.

Exemplarily, the third receiving module 4011 may receive a request for calling a conference access number from any site. An example in which the site is a terminal is described herein, but the site is not limited to the terminal. For example, the third receiving module 4011 receives the request for calling the conference access number of the first conference to join the first conference from a first terminal.

A second allocating module 4012 is configured to allocate the first multipoint control server to the first conference according to a conference scheduling policy.

Exemplarily, the conference scheduling policy may be stored in the management platform 40, and may also be stored in another storage unit for the management platform 40 to use. The conference scheduling policy may be as follows: scheduling port resources of an MCU according to a quantity of sites included in a conference. For example, if port resources of the first MCU are more than resources required by sites included in the first conference, the second allocating module 4012 allocates the sites included in the first conference to the first MCU, so that the first conference is held on the first MCU.

A second notifying module 4013 is configured to instruct the first multipoint control server to hold a conference, so that the first multipoint control server calls sites included in the first conference to join the conference.

Exemplarily, after the second allocating module 4012 allocates the first MCU to the first conference, the second notifying module 4013 instructs the first MCU to hold a conference; and the first MCU calls a number of a site that is allocated to the first MCU. For example, a conference access number of the second conference is one of site numbers included in the first conference, and therefore, the conference access number of the second conference is allocated to the first MCU, and the first MCU calls the conference access number of the second conference.

Further, the first scheduling unit 401 may further include a querying module 4014, configured to query conference status information of the first conference according to the conference access number of the first conference, determine that the first conference is in an ongoing state, and add the any site to the first conference.

A querying module 4014 is further configured to query, according to the conference information of the first conference, whether a number of the any site is one of site numbers included in the first conference.

The second notifying module 4013 is further configured to: after the querying module 4014 determines, according to the conference information of the first conference, that the number of the any site is one of the site numbers included in the first conference, send an address of the first multipoint control server to the any site, so that the any multipoint control server site calls the first multipoint control server to join the first conference; or after the querying module 4014 determines, according to the conference information of the first conference, that the number of the any site is not one of the site numbers included in the first conference, and after the second allocating module 4012 allocates the any site to the first multipoint control server, send an address of the first multipoint control server to the any site, so that the any site calls the first multipoint control server to join the first conference.

The second scheduling unit 402 is configured to allocate a second multipoint control server to the second conference according to conference information of the second conference carried in a call from the first multipoint control server, where the conference information of the second conference includes the conference access number of the second conference and a site number included in the second conference.

Exemplarily, the second scheduling unit 402 may include the following modules.

A first receiving module 4021 is configured to receive a request for calling the conference access number of the second conference from the first multipoint control server.

Exemplarily, the first receiving module 4021 receives a request for calling the conference access number of the second conference from the first MCU.

An adding module 4022 is configured to add the conference access number of the first conference to the conference information of the second conference.

Exemplarily, that the adding module 4022 adds the conference access number of the first conference to the conference information of the second conference may be as follows: adding, by the adding module 4022, the conference access number of the first conference as a site number included in the second conference, so that the conference access number of the first conference is used as one of the site numbers included in the second conference.

A first allocating module 4023 is configured to allocate the second multipoint control server to the second conference according to the conference scheduling policy.

Exemplarily, if port resources of the second MCU are more than resources required by sites included in the second conference, the first allocating module 4023 allocates the sites included in the second conference to the second MCU, so that the second conference is held on the second MCU.

The first notifying module 4024 is configured to instruct the second multipoint control server to hold a conference, so that the second multipoint control server calls sites included in the second conference into the conference.

Exemplarily, after the first allocating module 4023 allocates the second MCU to the second conference, the first notifying module 4024 instructs the second MCU to hold a conference; and the second MCU calls a number of a site that is allocated to the second MCU. For example, the conference access number of the first conference is one of site numbers included in the second conference, and therefore, the conference access number of the first conference is allocated to the second MCU, and the second MCU calls the conference access number of the first conference.

The establishing unit 403 is configured to establish a cascading channel between the first multipoint control server and the second multipoint control server.

Exemplarily, the establishing unit 403 may include the following modules.

A second receiving module 4031 is configured to receive a request of the second multipoint control server for calling the conference access number of the first conference.

Exemplarily, the second receiving module 4031 receives a request of the second MCU for calling the conference access number of the first conference.

A sending module 4032 is configured to send an address of the first multipoint control server to the second multipoint control server, so that the second multipoint control server calls the first multipoint control server to establish the cascading channel between the first multipoint control server and the second multipoint control server.

Exemplarily, the sending module 4032 sends an address of the first MCU to the second MCU, so that the second MCU calls the first MCU to establish the cascading channel between the first MCU and the second MCU.

Further, the management platform 40 may further include a storage unit 404, configured to store conference information including the conference information of the first conference and the conference information of the second conference, and the conference scheduling policy, where in a case in which a plurality of conference is set, the conference information includes a conference access number of each conference and a site number included in each conference, and the site number of one conference may include a conference access number of another conference.

It should be noted that modules having same functions in this embodiment may be replaced with one functional module as long as a same effect can be achieved. For example, modules such as the first receiving module 4021, the second receiving module 4031, and the third receiving module 4011 involved in this embodiment that have same functions may also be replaced by using one module as long as the module can achieve a same effect.

According to the management platform 40 according to this embodiment of the present invention, a conference access number of a second conference is added as a site of a first conference to the first conference, so that the first conference automatically activates the second conference and automatically establishes a cascading channel between the first conference and the second conference, thereby implementing automatic holding and cascading of conferences. This resolves a problem of complex operations caused by separately holding conferences before cascading the conferences.

Figure 6:
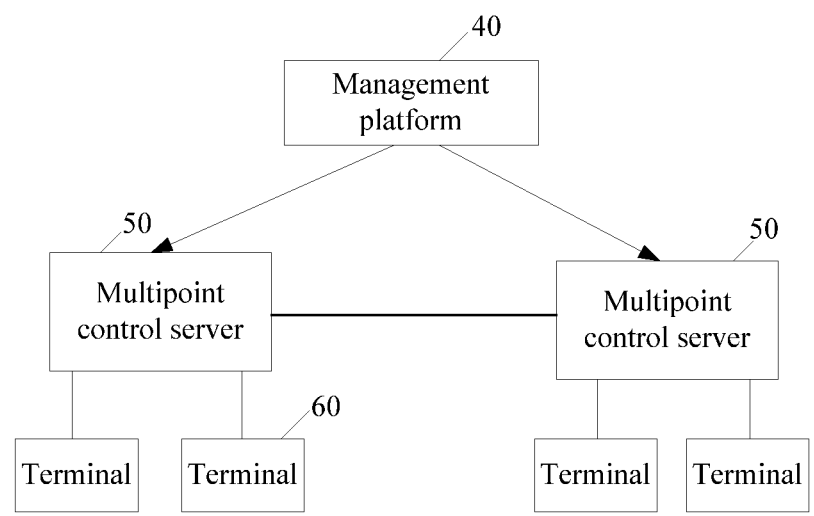
FIG. 6 is a diagram of a system for establishing a cascade of multipoint control servers according to an embodiment of the present invention.

In one aspect, an embodiment of the present invention provides a system for establishing a cascade of multipoint control servers, which can execute all steps of the foregoing method and achieve a same effect. Referring to FIG. 6, the system includes the following.

At least one management platform 40 is configured to allocate a first multipoint control server to a first conference according to conference information of the first conference carried in a call from any site, where the conference information of the first conference includes a conference access number of the first conference and a site number included in the first conference, and the site number included in the first conference includes a conference access number of a second conference; allocate a second multipoint control server to the second conference according to conference information of the second conference carried in a call from the first multipoint control server, where the conference information of the second conference includes the conference access number of the second conference and a site number included in the second conference; and establish a cascading channel between the first multipoint control server and the second multipoint control server.

At least two multipoint control servers 50 are configured to call sites to hold a conference.

Exemplarily, the multipoint control servers may be MCUs.

A terminal 60 is configured to join the conference by using one of the multipoint control servers.

Figure 7:
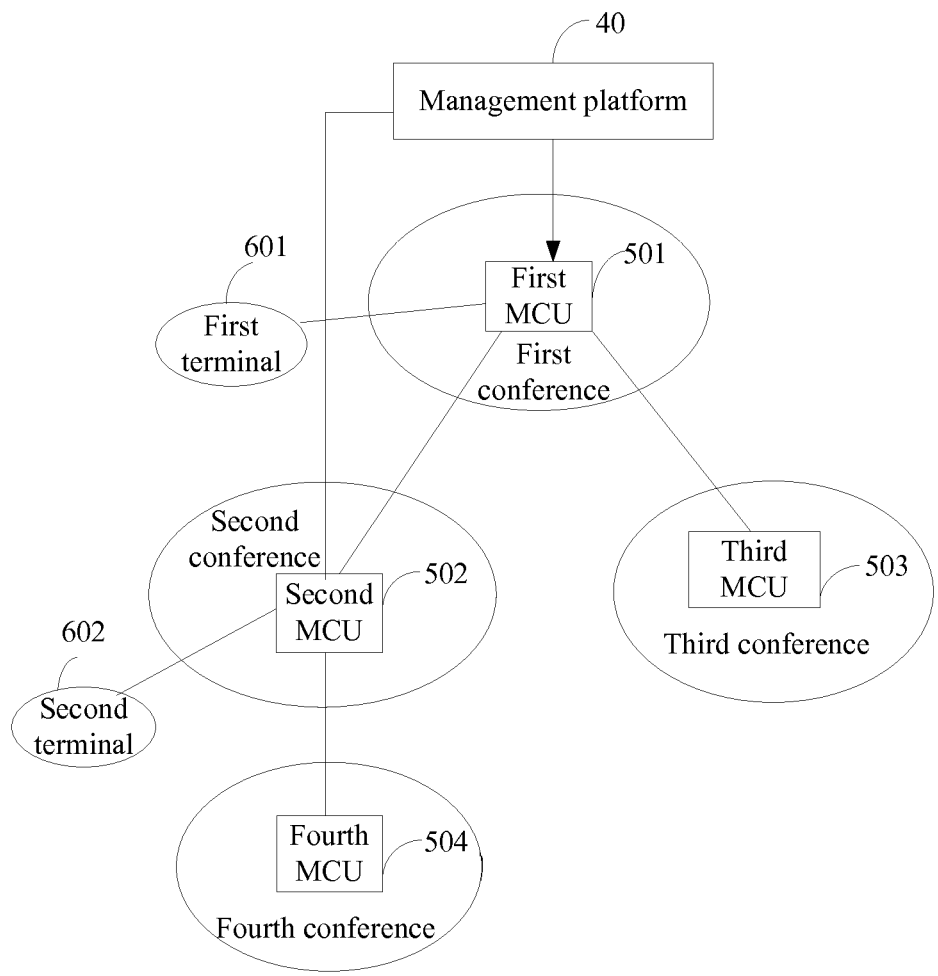
FIG. 7 is a diagram of another system for establishing a cascade of multipoint control servers according to an embodiment of the present invention.

A system shown in FIG. 7 is described in detail as an example. The system includes a management platform 40, a plurality of MCUs 50 (a first MCU to a fourth MCU), and a plurality of terminals 60.

Exemplarily, conference information is predefined and stored in the management platform 40. The predefined conference information includes a conference access number of each conference and a site number included in each conference, where the site number of one conference may include a conference access number of another conference. Therefore, a tree-like structure is formed among the conferences. For example, in the system shown in FIG. 7, four conferences, that is, a first conference to a fourth conference, are predefined, where conference access numbers of the second conference and the third conference are site numbers of the first conference, and a conference access number of the fourth conference is a site number of the second conference. Therefore, a tree-like topology relationship is formed among the conferences. Conferences and a topology relationship among the conferences included in the conference information may be customized according to requirements and actual conditions.

This embodiment is described by using an example in which a first conference and a second conference are held and a cascading channel between a first MCU and a second MCU is established.

The management platform 40 receives a request for calling a conference access number of the first conference from a first terminal 601.

Exemplarily, the management platform 40 may receive a request for calling a conference access number from any site, where the site may be a terminal or an MCU. An example in which the site is a terminal is described herein.

The management platform 40 queries whether the first conference is in an ongoing state.

Exemplarily, the management platform 40 may query, according to the conference access number of the first conference and recorded conference status information, whether the first conference is in an ongoing state.

The management platform 40 adds the first terminal 601 to the first conference if the first conference is in the ongoing state. The adding method and process are the same as those in the method embodiment, and therefore no further details are provided herein.

The management platform 40 allocates the first MCU to the first conference according to a conference scheduling policy if the first conference is in a pending state.

Exemplarily, the conference scheduling policy may be stored in the management platform 40, and may also be stored in another storage unit for the management platform 40 to use. The conference scheduling policy may be as follows: scheduling port resources of an MCU according to a quantity of sites included in a conference. For example, if port resources of the first MCU are more than resources required by sites included in the first conference, the terminals included in the first conference are allocated to the first MCU, so that the first conference is held on the first MCU.

The management platform 40 instructs the first MCU to hold a conference.

Exemplarily, after allocating the first MCU to the first conference, the management platform 40 instructs the first MCU to hold a conference; and the first MCU calls a number of a site that is allocated to the first MCU. For example, a conference access number of the second conference is one of site numbers included in the first conference, and therefore, the conference access number of the second conference is allocated to the first MCU, and the first MCU calls the conference access number of the second conference.

The management platform 40 receives a request for calling the conference access number of the second conference from the first MCU.

The management platform 40 queries whether the second conference is in an ongoing state.

The management platform 40 adds the first conference to the second conference if the second conference is in the ongoing state. The adding process is the same as that in the method embodiment, and therefore no further details is provided herein.

If the second conference is in a pending state, the management platform 40 adds the conference access number of the first conference to the conference information of the second conference. For example, the management platform adds the conference access number of the first conference as a site number included in the second conference, so that the conference access number of the first conference is used as one of the site numbers included in the second conference.

The management platform 40 allocates the second MCU to the second conference according to the conference scheduling policy.

For example, if port resources of the second MCU are more than resources required by sites included in the second conference, the management platform allocates the terminals included in the second conference to the second MCU, so that the second conference is held on the second MCU.

The management platform 40 instructs the second MCU to hold a conference.

Exemplarily, after allocating the second MCU to the second conference, the management platform 40 instructs the second MCU to hold a conference; and the second MCU calls a number of a site that is allocated to the second MCU. For example, the conference access number of the first conference is one of site numbers included in the second conference, and therefore, the conference access number of the first conference is allocated to the second MCU, and the second MCU calls the conference access number of the first conference.

The management platform 40 receives a request for calling the conference access number of the first conference from the second MCU.

The management platform 40 sends an address of the first MCU to the second MCU.

The second MCU calls the first MCU to establish a cascading channel between the first MCU and the second MCU.

Figure 8:
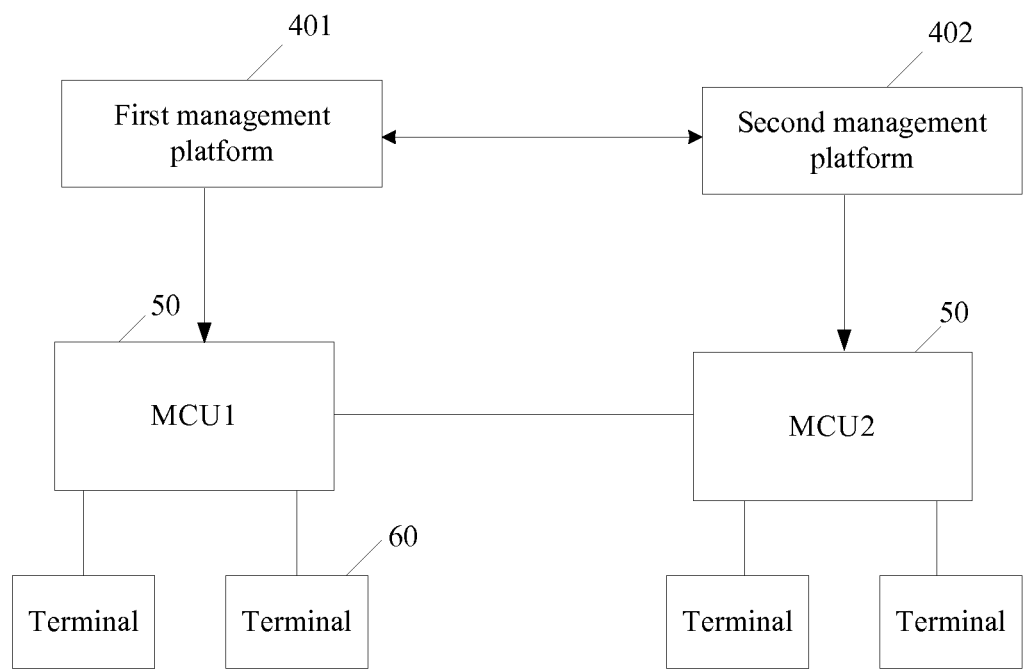
FIG. 8 is a diagram of another system for establishing a cascade of multipoint control servers according to an embodiment of the present invention.

Preferably, referring to FIG. 8, a plurality of management platforms 40 may be set as long as conference information of a multipoint conference is preset on each management platform 40. For example, as shown in FIG. 8, a first management platform 401 and a first MCU are set on a side of the first conference, and a second management platform 402 and a second MCU are set on a side of the second conference, where a principle of holding the first conference and the second conference and a principle of cascading the first MCU and the second MCU are the same as those in the foregoing method, and therefore no further details are provided herein and only differences during a specific process are described. That is, the first management platform 401 schedules the first conference to the first MCU; a conference access number of the second conference is scheduled to the first MCU; the first MCU initiates a call to the second management platform 402 to call a conference access number of the second conference; the second management platform 402 schedules the second conference to the second MCU; and a conference access number of the first conference is scheduled to the second MCU. Likewise, the second MCU initiates a call to the first management platform 401 to call the conference access number of the first conference; the second management platform 402 sends an address of the first MCU to the second MCU, and the second MCU calls the first MCU, so that the first MCU and the second MCU are cascaded.

An effect of selecting a plurality of management platforms is to facilitate information exchange between the management platforms.

In an actual application, if a conference to be held changes, the management platform 40 obtains modified conference information.

According to the system for establishing a cascade of multipoint control servers according to this embodiment of the present invention, a conference access number of a second conference is added as a site of a first conference to the first conference, so that the first conference automatically activates the second conference and automatically establishes a cascading channel between the first conference and the second conference, thereby implementing automatic holding and cascading of conferences. This resolves a problem of complex operations caused by separately holding conferences before cascading the conferences.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing a cascade of a plurality of multipoint control servers, the method comprising:
    allocating, by a management platform, a first multipoint control server of the plurality of multipoint control servers to a first conference according to conference information of the first conference carried in a call from any site, wherein the conference information of the first conference comprises a conference access number of the first conference and a site number comprised in the first conference and wherein the site number comprised in the first conference comprises a conference access number of a second conference;
    receiving, by the management platform, a request for calling the second conference from the first multipoint control server, wherein the request for calling the second conference carries conference information of the second conference;
    allocating, by the management platform, a second multipoint control server of the plurality of multipoint control servers to the second conference according to the conference information of the second conference, wherein the conference information of the second conference comprises the conference access number of the second conference and a site number comprised in the second conference;
    and establishing, by the management platform, a cascading channel between the first multipoint control server and second multipoint control server.

2. The method according to claim 1, wherein receiving the request for calling the second conference from the first multipoint control server and allocating the second multipoint control server to the second conference comprises:
    receiving, by the management platform, the request for calling the conference access number of the second conference from the first multipoint control server;
    adding, by the management platform, the conference access number of the first conference to the conference information of the second conference;
    allocating, by the management platform, the second multipoint control server to the second conference according to a conference scheduling policy; and
    instructing, by the management platform, the second multipoint control server to hold a conference, so that the second multipoint control server calls a site comprised in the second conference to join the conference.

3. The method according to claim 2, wherein adding the conference access number of the first conference to the conference information of the second conference comprises adding the conference access number of the first conference as a site number comprised in the second conference.

4. The method according to claim 2, wherein establishing the cascading channel between the first multipoint control server and the second multipoint control server comprises:
    receiving, by the management platform, a request for calling the conference access number of the first conference from the second multipoint control server; and
    sending, by the management platform, an address of the first multipoint control server to the second multipoint control server, so that the second multipoint control server calls the first multipoint control server to establish the cascading channel between the first multipoint control server and the second multipoint control server.

5. The method according to claim 1, wherein allocating the first multipoint control server to the first conference comprises:
    receiving, by the management platform, a request for calling the conference access number of the first conference from the any site;
    allocating, by the management platform, the first multipoint control server to the first conference according to a conference scheduling policy; and
    instructing, by the management platform, the first multipoint control server to hold a conference, so that the first multipoint control server calls a site comprised in the first conference to join the conference.

6. The method according to claim 5, further comprising:
    querying, by the management platform, conference status information of the first conference according to the conference access number of the first conference;
    determining that the first conference is in an ongoing state; and
    adding the any site to the first conference.

7. The method according to claim 6, wherein adding the any site to the first conference comprises, after determining that the number of the any site is one of site numbers comprised in the first conference, sending an address of the first multipoint control server to the any site, so that the any site calls the first multipoint control server to join the first conference.

8. The method according to claim 6, wherein adding the any site to the first conference comprises, after determining that the number of the any site is one of site numbers comprised in the first conference, allocating the any site to the first multipoint control server and sending an address of the first multipoint control server to the any site, so that the any site calls the first multipoint control server to join the first conference.

9. A management platform, comprising:
    a processor;
    and a non-transitory computer-readable storage medium storing a program to be executed by the processor, the program including instructions for:

allocating a first multipoint control server of a plurality of multipoint control servers to a first conference according to conference information of the first conference carried in a call from any site, wherein the conference information of the first conference comprises a conference access number of the first conference and a site number comprised in the first conference, and the site number comprised in the first conference comprises a conference access number of a second conference;

allocating a second multipoint control server of the plurality of multipoint control servers to the second conference according to conference information of the second conference carried in a call from the first multipoint control server, wherein the conference information of the second conference comprises the conference access number of the second conference and a site number comprised in the second conference;

and establish a cascading channel between the first multipoint control server and the second multipoint control server.

10. The management platform according to claim 9, wherein the program includes further instructions for:

receiving a request for calling the conference access number of the second conference from the first multipoint control server;

adding the conference access number of the first conference to the conference information of the second conference;

allocating the second multipoint control server to the second conference according to a conference scheduling policy; and instructing the second multipoint control server to hold a conference, so that the second multipoint control server calls a site comprised in the second conference to join the conference.

11. The management platform according to claim 10, wherein the program includes further instructions for adding the conference access number of the first conference as a site number comprised in the second conference.

12. The management platform according to claim 10, wherein the program includes further instructions for:

receiving a request for calling the conference access number of the first conference from the second multipoint control server; and sending an address of the first multipoint control server to the second multipoint control server, so that the second multipoint control server calls the first multipoint control server to establish the cascading channel between the first multipoint control server and the second multipoint control server.

13. The management platform according to claim 9, wherein the program includes further instructions for:

receiving a request for calling the conference access number of the first conference from the any site;

allocating the first multipoint control server to the first conference according to a conference scheduling policy; and instructing the first multipoint control server to hold a conference, so that the first multipoint control server calls a site comprised in the first conference to join the conference.

14. The management platform according to claim 13, wherein the program includes further instructions for querying conference status information of the first conference according to the conference access number of the first conference, determining the first conference is in an ongoing state, and adding any site to the first conference.

15. The management platform according to claim 14, wherein the program includes further instructions for:

querying, according to the conference information of the first conference, whether a number of the any site is one of site numbers comprised in the first conference; and after determining that the number of the any site is one of the site numbers comprised in the first conference, sending an address of the first multipoint control server to the any site, so that the any site calls the first multipoint control server to join the first conference.

16. The management platform according to claim 14, wherein the program includes further instructions for:

querying, according to the conference information of the first conference, whether a number of the any site is one of site numbers comprised in the first conference; and after determining that the number of the any site is not one of the site numbers comprised in the first conference and after allocating the any site to the first multipoint control server, sending an address of the first multipoint control server to the any site, so that the any site calls the first multipoint control server to join the first conference.

17. The management platform according to claim 13, wherein the program includes further instructions for storing conference information comprising the conference information of the first conference and the conference information of the second conference and the conference scheduling policy.

18. The management platform according to claim 9, wherein the program includes further instructions for storing conference information comprising the conference information of the first conference and the conference information of the second conference and a conference scheduling policy.

19. A system for establishing a cascade of multipoint control servers, comprising:

the management platform according to claim 9;

a plurality of multipoint control servers, configured to call sites to hold a conference; and a terminal, configured to join the conference using one of the multipoint control servers.

\* \* \* \* \*